United States Patent [19]

Gollomp

[11] 4,338,810
[45] Jul. 13, 1982

[54] CALIBRATOR FOR A MAGNETIC AZIMUTH DETECTOR

[75] Inventor: Bernard P. Gollomp, Far Rockaway, N.Y.

[73] Assignee: The Bendix Corporation, Teterboro, N.J.

[21] Appl. No.: 191,988

[22] Filed: Sep. 29, 1980

[51] Int. Cl.³ .............................................. G01C 17/38
[52] U.S. Cl. ..................................................... 73/1 E
[58] Field of Search .................... 73/1 E; 33/356, 357, 33/361, 362

[56] References Cited

U.S. PATENT DOCUMENTS

| | | | |
|---|---|---|---|
| 2,765,649 | 10/1956 | Youngclaus | 73/1 E |
| 2,887,872 | 5/1959 | Halpern et al. | 73/1 E |
| 4,091,543 | 5/1978 | Lapeyre | 33/356 |

Primary Examiner—S. Clement Swisher

Attorney, Agent, or Firm—Anthony F. Cuoco; Thomas L. Adams

[57] ABSTRACT

A calibrator (FIG. 1) can calibrate a magnetic azimuth detector (18) of a craft (50). The service detector (18) is responsive to the magnetic field of the earth to provide a service heading signal. The calibrator includes a test detector (10) for providing a test signal signifying the magnetic orientation of the test detector with respect to the prevailing magnetic field of the earth. Also included is a turntable (12) for rotatably supporting the test detector (10). Also included is a calibration computer (34) connected to the test detector (10) and responsive to the test heading signal. The calibration computer (34) is operable to determine the variations in the test heading signal due to changes in the magnetic field of the earth. The calibration computer (34) is operable to connect to the service detector (18) and determine the difference in the service heading signal when the craft (50) is adjacent to and removed from the service detector (18).

15 Claims, 2 Drawing Figures

CALIBRATOR FOR A MAGNETIC AZIMUTH DETECTOR

BACKGROUND OF THE INVENTION

The present invention relates to calibrators for a magnetic azimuth detector, in particular, to apparatus for calibrating a magnetic azimuth detector in an aircraft.

Known compass calibrators inject two precision currents into a magnetic azimuth detector (also referred to as a flux gate or a flux valve) to simulate rotation of the magnetic field of the earth while the aircraft is physically aligned to magnetic north. Prior to injection of these precision currents, the magnitudes of these currents are determined when the magnetic azimuth detector is outside and away from the magnetic disturbances of the aircraft. The magnetic azimuth detector is aligned to magnetic north and optical alignment equipment (e.g. telescope with reticule) is mounted to the magnetic azimuth detector and aimed at a distant monument, structure or geographic feature. Thereafter the magnetic azimuth detector is mounted in the craft using optical realignment equipment and precision currents are injected to simulate rotation.

Other approaches to calibrating a magnetic azimuth detector involve physically revolving the craft while the magnetic azimuth detector is mounted therein, to then characterize its reading as a function of aircraft heading. Such physical rotation requires precisely known physical monuments to precisely align the aircraft. A compass rose has been laid out at many airports for this purpose but utilization, of course, requires flying the aircraft to that facility at a significant cost in time, fuel, labor etc. Alternatively, the aircraft can be flown through a known circular course and the compass reading for the various positions of the aircraft recorded. This approach also requires significant flight time.

In a self-calibrating compass system, the magnetic azimuth detector is corrected by a directional gyro or stable inertial platform. While this approach provides reasonably good accuracy, the initial heading of the aircraft must be precisely known.

Accordingly, there is a need for an apparatus to calibrate a magnetic detector without the need to physically fly or rotate the aircraft. It is desirable that this calibration technique be performed without the need for elaborate and expensive optical alignment equipment and be operable at night and under inclement weather conditions.

SUMMARY OF THE INVENTION

In accordance with the illustrative embodiment demonstrating features and advantages of the invention, there is provided a calibrator for calibrating a service detector means (e.g. a magnetic azimuth detector) of a craft. This service detector means is responsive to the magnetic field of the earth to provide a service heading signal. This calibrator includes a test detector means for providing a test heading signal signifying the magnetic orientation of the test detector means with respect to the prevailing magnetic field of the earth. The calibrator also has a turntable adapted to rotatably support the service detector means or, in some embodiments, the test detector means. The calibrator also has a calibration means connected to the test detector means and responsive to the test heading signal. The calibration means is operable to determine the variation in the test heading signal due to changes in the magnetic field of the earth.

The calibration means is operable to connect to the service detector means and determine the difference in the service heading signal when the craft is adjacent to and removed from the service detector means.

Also according to a related method of the present invention, a test azimuth detector is employed for calibrating a biasable service azimuth detector of a craft. Each detector is responsive to the magnetic field of the earth for providing a heading signal. This method includes the step of subjecting the service detector to a rotating magnetic field while the craft is absent and while the craft is present. The method also includes the step of monitoring changes in the magnetic field of the earth with the test detector. Another step is measuring a change in the heading signal from when the craft is absent to when it is present for said service detector. The method also includes the step of resolving the change in the heading signal of said service detector into at least one spatial harmonic component.

By employing the foregoing apparatus and method an improved calibration technique is provided. Preferably, a test azimuth detector is operated in an open field to determine its characteristics and the changes in the prevailing magnetic field of the earth. Significantly, the magnetic characteristics of the open field need not exhibit a specific regularity but need only be stable. This azimuth detector is removed from its aircraft and is tested by either physical rotation or by application of a simulated rotating magnetic field to determine its characteristics in an open field. For some embodiments the test azimuth detector will also be subjected to this rotational test. Since the characteristics of the test azimuth detector were previously measured under laboratory conditions and its errors determined, the direction of the earth's magnetic field in the open field can be accurately measured by the test azimuth detector. This direction is established with respect to a reference monument or a line that may be laid on the ground in a northerly or any other arbitrary but fixed direction. Thereafter, the service azimuth detector is installed in its craft and the test azimuth detector is mounted adjacent thereto. Once mounted in this manner both the service azimuth detector and, if desired, the test azimuth detector are then subjected to a rotating magnetic field to determine their characteristics in the presence of the craft. While this rotating magnetic field could be obtained by physically rotating each azimuth detector, preferably, it is obtained by injecting precision currents into each azimuth detector to simulate an externally rotating magnetic field.

Preferably, the differential change in the response of a service azimuth detector due to the presence of the craft is subjected to Fourier analysis. This analysis resolves the differential data into the one and two cycle errors caused by the presence of the aircraft. Thereafter the service azimuth detector is biased by injecting into it currents which produce an internal, biasing, magnetic field. The injected currents are adjusted until the performance of the service azimuth detector approximately matches that previously measured in the open field. The injection currents producing this convergence are then trigonometrically resolved to determine the azimuthal change in the prevailing magnetic field prevailing in the presence of the aircraft. Thereafter the service azimuth detector is readjusted to align it along the craft centerline. This latter alignment is achievable since previously recorded were the angular orientation of the aircraft along a reference line and the magnetic field prevailing in the presence of the aircraft with respect to that reference line, in a manner described hereinafter.

Thereafter the service azimuth detector is biased by magnets or by injecting biasing signals until the service azimuth detector reads the actual heading with respect to the magnetic field prevailing in the open field. This actual heading is known since the prevailing magnetic field was measured in the open field with respect to a reference line and the craft angular orientation with respect to that reference line was also known. This adjustment corrects for one cycle errors.

Once the foregoing adjustments are performed the detector can also be compensated for two cycle errors in a conventional manner.

In a preferred embodiment the foregoing adjustments are accomplished through apparatus employing programmable resistor networks driven by precision power supplies. The networks provide precision currents, which may be switched through switches to either the service or test azimuth detector to determine their characteristics.

BRIEF DESCRIPTION OF THE DRAWINGS

The above brief description as well as other objects, features and advantages of the invention will be more fully understood by reference to the following detailed description of a presently preferred but nonetheless illustrative embodiment, when taken in conjunction with the accompanying drawings wherein.

DETAILED DESCRIPTION OF THE PREFERRED EMBODIMENT

Figure 1:
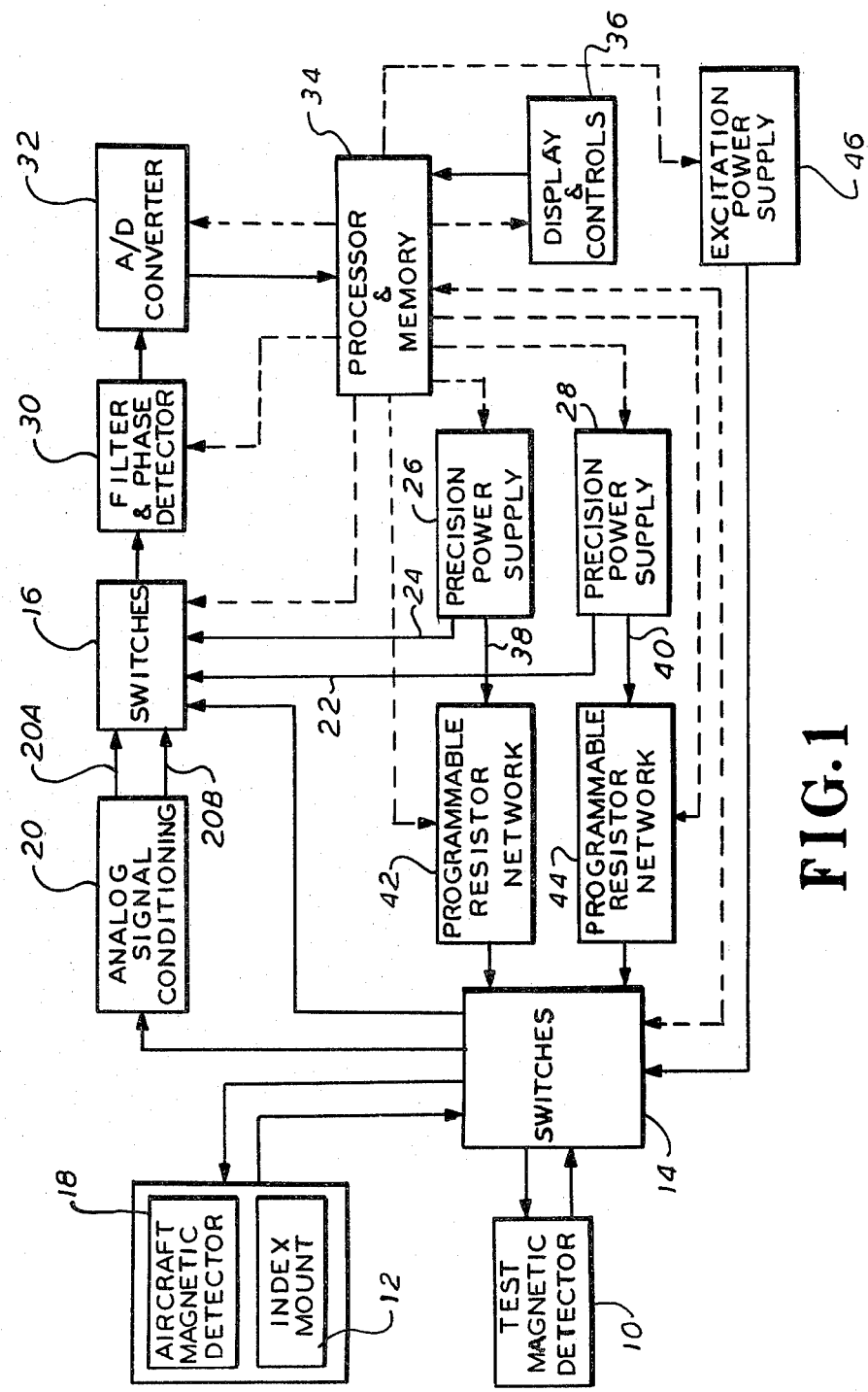
FIG. 1 is a schematic illustration of a detector calibrator according to the present invention.

Referring to FIG. 1, an exemplary calibrator is shown employing test detector means 10. In this embodiment, test detector means 10 is a magnetic azimuth detector of conventional construction employing three, equiangular, electromagnetic arms (not shown) which, depending upon its azimuthal position, conducts a varying amount of the earth's magnetic field through its arms. The magnetic intensity in each arm affects the harmonic content of alternating magnetic fields impressed therein by an associated driving coil. By measuring these harmonic components the angular orientation of the magnetic field of the earth with respect to the magnetic azimuth detector can be determined, using well understood trigonometric concepts or by using a synchro repeater. These known processing techniques need not be repeated herein.

Test detector 10 can be oriented into any desired azimuthal position. The heading signal produced by azimuth detector 10 is connected to coupler 14. In this embodiment coupler 14 is a plurality of switches cooperating with its associated group of switches 16, in a manner described hereinafter. There are two lines for exchanging data, between switches 14 and detector 10 (although it is to be understood that in practical embodiments more than one wire may be employed to provide a complete exchange of data). Switches 14 and 16 can employ a plurality of known devices such as relays.

A service detector means is shown herein as aircraft azimuth detector 18. This service detector is shown connected by a pair of data lines to switches 14. In this embodiment, azimuth detector 18 is constructed similarly to detector 10. Both detector 10 and 18 have windings on their respective branch arms which can be biased to produce a rotatable, magnetic field. Currents can be injected into these windings through switches 14. Service detector 18 is shown rotatably mounted on a turntable means, shown herein as turntable 12. In this embodiment turntable 12 employs a transducer that produces a signal indicating the angular displacement of the turntable 12 and its associated azimuth detector 18. These transducer signals are coupled to switches 14. Known angular transducers are used for this purpose.

The heading signals produced by azimuth detectors 10 and 18 may be analyzed by coupling one of them through switches 14 to analog signal conditioning device 20. This device can use any one of various conventional techniques to obtain an angular measurement. For example, operational amplifiers can be used effectively to reproduce the well-known "Scott connection," thereby providing sine and cosine outputs on lines 20A and 20B, respectively. Switches 16 conect to lines 20A and 20B and can substitute for them lines 22 and 24. Lines 22 and 24 provide precision currents from precision controlled current sources, as power supplies 28 and 26, respectively. Accordingly, switches 16 can substitute precise signals for those provided from the analog signal conditioning device 20 and thereby perform a self-calibrating function. Specifically, the calibrated current injected through switches 16 is verified as producing a predetermined response.

The sine and cosine signals provided by analog conditioning device 20 (or supplies 26 and 28) are applied by switch 16 to filtered phase detector 30. Detector 30 is a synchronous detector for changing a harmonic (nominally 800 Hertz) into a direct current signal, which is then applied to analog to digital converter 32.

A calibration means employing a memory means is shown herein as a processor and memory 34, in this embodiment, a microcomputer. Microcomputer 34 responds to the output lines connected to it from converter 32 and the controls, block 36, as shown. Microcomputer 34 also generates appropriate display signals which are displayed as indicated by display block 36. Microcomputer 34 provides control signals on its various output lines to couplers 14 and 16, precision power supplies 26 and 28, detector 30, converter 32, and other devices described hereinafter. The various data output lines of microcomputer 34 are shown broken to distinguish them from the other signal processing lines and enhance clarity. Microcomputer 34 can operate the various switches in couplers 14 and 16 and can also provide a control signal to detector 30 to regulate its operational parameters such as its bandwidth or demodulation rate. Also, converter 32 can be synchronized and interrogated by microcomputer 34. Similarly, the output of precision power supplies 26 and 28 can be adjusted in discrete steps by signals applied thereto from microcomputer 34.

Lines 38 and 40 of precision power supplies 26 and 28 connect to programmable resistor networks 42 and 44, respectively. Networks 42 and 44 are conventional resistor ladder networks whose internal switches operate to provide a variable current to switches 14. The control over the variable current provided by networks 42 and 44 is by output lines of microcomputer 34. In this embodiment supply 26 and network 42 as well as supply 28 and network 44 operate as a controlled current source for applying a variable current to azimuth detectors 10 and 18 to energize their internal coils and simulate rotation of the magnetic field of the earth. Power supply 46, shown controlled by an output line of microcomputer 34, connects to switches 14 to inject a 400 Hertz reference signal to either azimuth detector 10 or 18 to operate its magnetic circuit in a well-understood manner.

To facilitate an understanding of the principles associated with the foregoing apparatus, its operation will be briefly described. Initially the foregoing equipment is set up in an open field. Microcomputer 34 has stored in memory the characteristics of test azimuth detector 10 originally obtained by testing it in a Helmholz coil. These memorized characteristics signify the expected output from test detector 10 for various orientations. Microcomputer 34 operates switches 14, activates supplies 26 and 28 and adjusts networks 42 and 44 so that they couple through switches 14 a varying pair of biasing currents to the coils of test azimuth detector 10. These currents are sized to simulate rotation of the earth's magnetic field with respect to test compass 10. Test compass 10 consequently couples through switches 14 to conditioning device 20, heading information in the form of harmonic components buried in the 400 Hertz carrier frequency. In a well understood manner conditioning circuit 20 simulates a "Scott connection" to produce signals signifying the sine and cosine of heading. These heading signals are filtered and synchronously detected by detector 30 to provide a direct current signal whose magnitude is proportional to heading. This signal is converted into digital form by converter 32 and applied to microcomputer 34. The pattern of this data is compared by microcomputer 34 to the stored pattern previously obtained under laboratory conditions to determine that the test azimuth detector is still operating in its usual manner. Also, since the errors of the test azimuth detector 10 are known in advance the operator can accurately determine the direction of the magnetic field of the earth in the open field. This may be done by rotating test compass 10 until it produces a predetermined output heading signal signifying alignment with the prevailing magnetic field of the earth.

Next, service azimuth detector 18 is removed from its aircraft. Service azimuth detector 18 is then connected by switches 14, under the control of microcomputer 34, to signal conditioning circuit 20. Microcomputer 34 now stimulates and records the outputs of service asimuth 18 by electrically subjecting it to a rotating magnetic field caused by injection of biasing currents from networks 42 and 44 through switches 14. It is to be appreciated that in some embodiments instead of rotating the magnetic field electrically, the index mount 12 and thus azimuth detector 18 may be mechanically rotated to achieve the same result.

Figure 2:
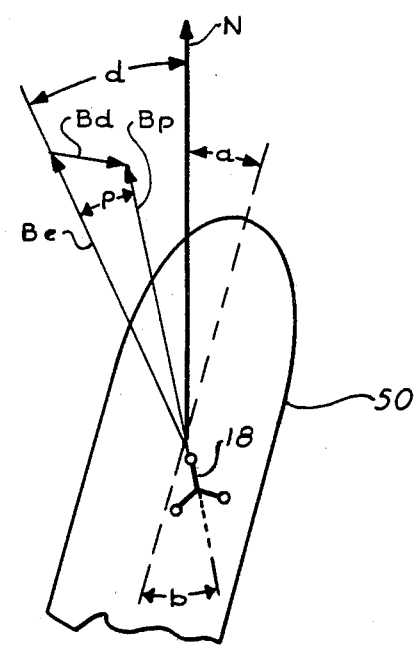
FIG. 2 is a diagram of the angular relationships associated with the calibrator of FIG. 1.

The aircraft into which azimuth detector 18 is to be installed is now brought into the open field and aligned to the previously mentioned reference line. Referring to FIG. 2 this reference line is shown as north line N, a fiduciary line painted on an apron at an airport. While in this embodiment reference line N is aligned to magnetic north, such alignment is unnecessary provided the reference line is fixed. The deviation of aircraft 50 (FIG. 2) from reference line N, angle a, is measured by suspending a plumb line from the center line of the craft and measuring the displacement of the center line from reference line N at two positions. The angular measurement so obtained is entered into microcomputer memory through controls 36 (FIG. 1).

It will be appreciated that the angular deviation, angle d (FIG. 2), between reference line N and the magnetic field prevailing in the absence of aircraft 50 (open field) has already been measured. Magnetic vector Be represents the magnitude and the direction of that magnetic field prevailing in the absence of aircraft 50. As illustrated in FIG. 2, the presence of aircraft 50 changes the magnitude and direction of the prevailing magnetic field, this disturbed field being illustrated as vector Bp. The net change in magnetic field is indicated by vector Bd. Aircraft service azimuth detector 18 (FIG. 1) is now installed in the aircraft and if desired test azimuth detector 10 may be mounted immediately adjacent thereto by means of suction cups or other supportive devices. Upon installation service azimuth detector 18 is physically aligned along the magnetic field prevailing inside the aircraft.

Next, service azimuth detector 18 (and if present test azimuth detector 10) are again subjected to relative rotation of its ambient magnetic field. While this relative rotation could be performed by physically rotating an azimuth detector, for convenience the coils contained in azimuth detector 10 and 18 are biased by currents from networks 42 and 44 injected through switches 14 to simulate rotation. The foregoing rotation allows microcomputer 34 to store new patterns of data. Microcomputer 34 compares the patterns produced in the presence and absence of the aircraft for service azimuth detector 18 (and if present test azimuth detector 10). Changes in the pattern of data is analyzed by a Fourier transformation subroutine in microcomputer 34. Accordingly, this differential data is resolved into spatial harmonics against the angular variable, azimuthal rotation of the detector. Thereafter, microcomputer 34 iteratively alters the current injected into service azimuth detector 18 by means of networks 42 and 44 through switches 14. This iterative alteration tends to approach the current nominally required to produce an offsetting magnetic vector tending to cancel magnetic vector Bd (FIG. 2). As a practical matter, these offsetting currents are initially set at one-half of this nominal value and then adjusted as follows: Service detector 18 is electrically rotated as previously described and its response is compared to that previously occurring in the open field. The response of service azimuth detector 18 will tend to converge on the pattern of data previously produced in the open field due to the biasing currents. If this response has not completely converged to within a predetermined tolerance, the previously mentioned biasing current (iterative) incrementation and the electrical rotation test, are both repeated until convergence is obtained. The biasing currents producing this convergence are now subjected to a conventional trigonometric analysis to determine the angular perturbation, angle p in FIG. 2, represented thereby.

Accordingly, it is now possible to rotate service azimuth detector 18 from the position shown in FIG. 2 (that is, alignment with the prevailing magnetic field Bp within aircraft 50) angle b, thereby aligning service detector 18 with the craft center line. It is apparent that angle b is known since: angle a was previously measured, angle d was also previously measured and angle p, as just described, has been measured. Clearly, angle b equals angle a plus the difference between angle d and angle p. Azimuth detector 18 is now bolted into this position and thereafter test detector 10, being no longer required, may be removed from the test site.

It is apparent that when aircraft 50 is oriented as shown, service detector 18 ought to read a heading of angle d plus angle a. Therefore the magnetic biasing means normally provided on azimuth detector 18 is now adjusted so that such a heading is displayed on the instruments in aircraft 50 associated with service detector 18.

It is to be appreciated that modifications and alterations may be implemented with respect to the apparatus just described. For example, many alternate programs may be implemented to perform some of the forgoing functions but in perhaps a different sequence and at a different rate. In addition many circuits may be constructed to provide the precision control currents employed in the foregoing apparatus. Also, various signal processing techniques may be employed to analyze the signals produced by the magnetic azimuth detectors disclosed herein. Moreover, various switching techniques using relays or semiconductor switches can be used to connect the various components disclosed herein. Also, instead of electrical simulation of a rotating magnetic field, the detectors can be mechanically rotated instead. In addition, in some embodiments certain test steps may be eliminated to same time or when only a portion of the testing program is required.

Obviously, many modifications of the present invention are possible in light of the above teachings. It is therefore to be understood that within the scope of the appended claims, the invention may be practiced otherwise than as specifically described.

What is claimed is:

1. A calibrator for calibrating a service detector means of a craft, said service detector means being responsive to the magnetic field of the earth to provide a service heading signal, said service detector means being operable without said calibrator, said calibrator comprising:
    a test detector means for providing a test heading signal signifying the magnetic orientation of said test detector means with respect to the prevailing magnetic field of the earth;
    turntable means adapted to rotatably support said service detector means; and
    calibration means connected to said test detector means and responsive to said test heading signal, said calibration means being operable to determine the variation in said test heading signal due to changes in the magnetic field of the earth, said calibration means being operable to connect to said service detector means and determine the difference in said service heading signal when said craft is adjacent to and removed from said service detector means, said calibration means including:
    memory means operable to connect to said service detector means for storing a succession of values of said service heading signal.

2. A calibrator according to claim 1 wherein said turntable means is operable to provide a reference signal signifying angular mechanical displacement of said service detector means by said turntable means, said calibration means being connected to said turntable means and responsive to its reference signal.

3. A calibrator according to claim 2 comprising:
    memory means for storing a succession of values of said service heading signal and said reference signal, each of said values of said reference signal being contemporaneously produced and stored with a corresponding one of a succession of values of said service heading signal.

4. A calibrator according to claim 1 further comprising:
    a controlled current source connected to said calibration means and responsive to a signal therefrom for controlling the current from said source, said source being operable to inject its current into said service detector means to simulate rotation with respect to the magnetic field of the earth and provide said succession of values of said service heading signal.

5. A calibrator according to claims 3 or 4 wherein said succession of values of said service heading signal comprises a first and second pattern of data stored when said craft is adjacent and is removed from said service detector means, respectively, said calibration means being operable to resolve the change between said first and second pattern into at least one spatial harmonic component.

6. A calibrator according to claim 5 wherein said calibration means is connected to said test detector means and wherein said memory means is operable to store a succession of values of said test heading signals having a third pattern of data, said third pattern being stored when said test detector means is operated in the absence of said craft, said calibration means providing a signal signifying variations in the prevailing magnetic field of the earth.

7. A calibrator according to claim 6 wherein said service detector means includes means for biasing said service heading signal, said calibration means being operable after a change in the biasing of said service detector means to update the data of said second pattern.

8. A calibrator according to claim 1 further comprising:
    an coupler connected to said test and service detector means for connecting either one to said calibration means.

9. A calibrator according to claim 8 further comprising:
    a controlled current source connected to said calibration means and responsive to a signal therefrom for controling the current from said source, said coupler being operable to inject the current from said source to either one of said test and service detector means to simulate a rotation of the magnetic field of the earth.

10. A calibrator according to claim 1 wherein said test detector means is rotatable into a plurality of azimuthal positions.

11. A non-optical method employing a test azimuth detector for calibrating a biasable service azimuth detector of a craft, each detector being responsive to the magnetic field of the earth to provide a heading signal, the method comprising the steps of:
    subjecting said service detector to a rotating magnetic field while said craft is absent and while said craft is present and fitted with said service detector;
    monitoring changes in the magnetic field of the earth with said test detector;
    measuring a change in the heading signal from when said craft is absent to when it is present for said service detector;

resolving said change in the heading signal of said service detector into at least one spatial harmonic component;

magnetically biasing said service detector in a direction to reduce at least one of said spatial components; and azimuthally and physically adjusting said service detector in said craft to an extent bearing a predetermined relation to said biasing.

12. A method according to claim 11 wherein said biasing step comprises:

installing said service detector in said craft; and biasing said service detector by applying to it a biasing magnetic field, said biasing magnetic field being dimensioned to alter the heading signals when said craft is present to correspond to that which occurred when the craft was absent.

13. A method according to claim 12 wherein said adjusting step comprises:

rotating said service detector after its installation by an offset angle bearing a predetermined relation to the dimension of said biasing magnetic field.

14. A method according to claim 13 wherein said offset angle bears a predetermined relation to said change in the heading signal from when said craft is absent to when it is present.

15. A method according to claim 14 further comprising the step of:

readjusting said biasing magnetic field after rotating said service detector said offset angle to produce from it said heading signal at a value corresponding to the orientation of said craft.

* * * * *